(12) United States Patent
Griebel et al.

(10) Patent No.: US 7,536,327 B2
(45) Date of Patent: May 19, 2009

(54) METHOD AND DEVICE FOR EVALUATION OF FINANCIAL DERIVATIVES USING SPARSE GRIDS

(75) Inventors: Michael Griebel, Weberstraβe 98, DE-53113 Bonn (DE); Thomas Gerstner, Haydnstraβe 34, DE-53115 Bonn (DE); Sebastian Wahl, Bonn (DE)

(73) Assignees: Michael Griebel, Bonn (DE); Thomas Gerstner, Bonn (DE)

(*) Notice: Subject to any disclaimer, the term of this patent is extended or adjusted under 35 U.S.C. 154(b) by 1378 days.

(21) Appl. No.: 09/994,114

(22) Filed: Nov. 26, 2001

(65) Prior Publication Data

US 2002/0103738 A1    Aug. 1, 2002

(30) Foreign Application Priority Data

Dec. 13, 2000    (DE)    ................................. 100 62 120

(51) Int. Cl.
    *G06Q 40/00*    (2006.01)
(52) U.S. Cl. ........................... 705/35; 705/36 R; 705/37
(58) Field of Classification Search .............. 705/35–37
See application file for complete search history.

(56) References Cited

U.S. PATENT DOCUMENTS

| | | | |
|---|---|---|---|
| 5,940,810 A | | 8/1999 | Traub et al. |
| 6,058,377 A | | 5/2000 | Traub et al. |
| 6,061,662 A | * | 5/2000 | Makivic ................... 705/36 R |
| 6,304,888 B1 | * | 10/2001 | Mizuta ....................... 708/444 |
| 6,772,136 B2 | * | 8/2004 | Kant et al. .................... 706/50 |
| 2002/0065755 A1 | * | 5/2002 | Shlafman et al. .............. 705/36 |

FOREIGN PATENT DOCUMENTS

EP      1215603 A2   *   6/2002

OTHER PUBLICATIONS

"Numerical Integration Using Sparse Grids," by Thomas Gerstner and Michael Griebel and communicated by C. Brezinski (1998) pp. 209-232.*
"The Curse of Dimension and a Universal Method for Numerical Integration,". by Erich Novak and Klaus Ritter (1997). pp. 177-188.*
Complexity and Information, by J.F. Traub and A.G. Werschultz (1998).*

* cited by examiner

*Primary Examiner*—Jagdish N Patel
*Assistant Examiner*—Sara Chandler
(74) *Attorney, Agent, or Firm*—Pauley Petersen & Erickson (57) ABSTRACT

A method and device for valuation of financial derivatives, wherein a value of a derivative is computed by a determination of an expectation. Input parameters are communicated by an input unit to a computer, such as at least one processor, to establish an integrand as a function of the input parameters. A multivariate integration domain is computed. A sparse grid method is used to determine integration points and integration weights as a function of the input parameters. The integrand is integrated with an integration domain at the integration points to determine integrand values. One or more expectation parameters are computed by combining the integrand values and the integration weights. A value of the derivative is communicated through an output unit, for example to a display monitor or another display device.

20 Claims, 6 Drawing Sheets

METHOD AND DEVICE FOR EVALUATION OF FINANCIAL DERIVATIVES USING SPARSE GRIDS

BACKGROUND OF THE INVENTION

1. Field of the Invention

This invention relates to a method and device for electronic data processing, particularly in the field of financial informatics. More particularly, this invention relates to fast and accurate valuation of financial derivatives using electronic computer systems.

2. Description of Related Art

The valuation of financial derivatives has become popular in the last decade and has become an important instrument in financial economics. The possibility of such valuation is a necessary prerequisite for a financial institution to be able to offer a new derivative. Also, this valuation is necessary in order to structure, collateralize, and optimize a financial portfolio.

There are many different kinds of financial derivatives, such as those based on interest rates and/or assets. This includes, among others, bonds, swaps, future, CMOs, and options. Their valuation occurs under the assumption of the arbitrage principle using partial differential equations or the martingale approach. The martingale is more general, where a stochastic process for an underlying value, such as an interest rate or asset price, is first specified. Then, the equivalent martingale measure which converts the underlying process into a martingale is determined. Finally, the value of the derivative is computed as the expectation of its discounted payoff function under this risk-neutral measure. Under certain conditions the approaches via partial differential equations and martingales are equivalent. The connection is made by generalized Feynman-Kacz formulas. However, the martingale approach is more universal and easier to adapt to new situations.

The price of a financial derivative can thus be expressed as an expectation. In continuous time, the integrand itself contains a path integral, which can be discretized with the Euler method/trapezoidal rule or similar methods. Sometimes, induced by the application, a time-discrete model is used. Both cases lead to high-dimensional integration problems. For the simple European call option it is possible to give a closed-form solution, a Black-Scholes formula, but more complex options require a numerical solution method. This holds for other types of financial derivatives analogously.

Classical multivariate quadrature is not suited as a numerical integration method for high-dimensional integrands. Problems associated with dimension are encountered because the work scales exponentially with the dimension. The complexity is of the order O ($N^{-r/d}$) where r is the smoothness of the integrand and d its dimension. On the other hand, the Monte Carlo method is independent of the dimension. Here, the integrand f is evaluated at a random series of N points $x_i$ which results in the following quadrature formula.

$$Q_N f = \frac{1}{N} \sum_{i=1}^{N} f(x_i) \qquad \text{Equation 1}$$

The Monte Carlo methods converges very slowly and only in a stochastic sense. The accuracy which can be reached with N function evaluations is of the order O ($1/\sqrt{N}$). With Quasi-Monte Carlo methods which have been developed in the last decade, the integrand is evaluated at a deterministically determined series of points $x_i$ and in analogy to the Monte Carlo method, the following quadrature formula is used.

$$Q_N f = \frac{1}{N} \sum_{i=1}^{N} f(x_i) \qquad \text{Equation 2}$$

There is a variety of different constructions, for example the Halton, Sobol sequences or Faure sequences, which differ in corresponding pre-asymptotic behavior and all have an order of convergence of O ($(\log N)^d/N$). In addition the error is deterministic. Prototype is the program FinDer of J. Traub, S. Paskov, *Faster evaluation of financial derivatives*, Journal of Portfolio Management 22, 1, 113-120 (1995), which is used by many banks. This method is disclosed by U.S. Pat. Nos. 5,940,810 and 6,058,377.

On the other hand, the so-called sparse grid method is an approach where multivariate quadrature formulas are constructed by suitable combination of tensor products of univariate quadrature formulas, such as the Clenshaw-Curtis or Gauss-Patterson formulas.

The general sparse grid methods can be described as follows. Consider a series of univariate quadrature formulas for a univariate function f, represented by the following formula.

$$Q_l^1 f := \sum_{i=1}^{n_l^1} w_{li} \cdot f(\chi_{li}) \qquad \text{Equation 3}$$

Now, define the difference formula by $$\Delta_k^1 f := (Q_k^1 - Q_{k-1}^1) f \text{ with}$$

$$Q_0^1 f := 0 \qquad \text{Equation 4}$$

The sparse grid construction for d-dimensional functions f consists for $l \in \mathbb{N}$ and $k \in \mathbb{N}^d$ of $$Q_l^d f := \sum_{k \in I_l} (\Delta_{k_1}^1 \otimes \ldots \otimes \Delta_{k_d}^1) f \qquad \text{Equation 5}$$

with index sets $I_l$ such that the following function holds for all $k \in I_l$ $$k - e_j \in I_l \text{ for } 1 \leq j \leq d, k_j > 1 \qquad \text{Equation 6}$$

Figure 4:
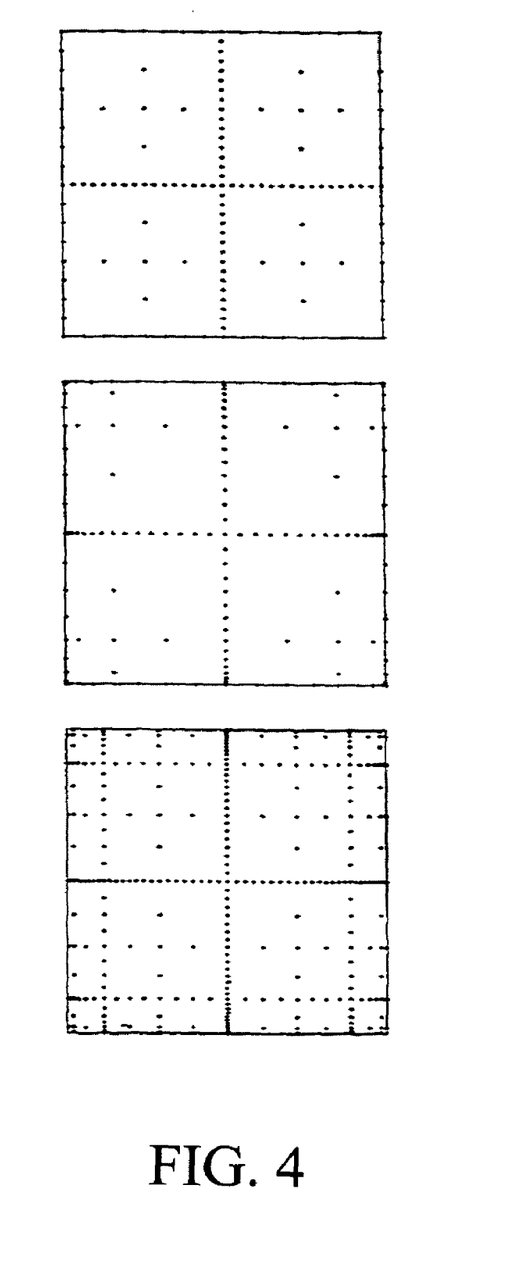
FIG. 4 is a diagram showing two-dimensional renderings of classical sparse grids based on the trapezoidal rule, the Clenshaw-Curtis formula, the Gauss-Patterson formula, and the Gauss-Legender formula.

Special cases of the method are classical sparse grids, where $I_l = \{|k|_1 \leq l + d - 1\}$, as well as classical product formulas where $I_l = \{|k|_\infty \leq l\}$. FIG. 4 shows examples of three different classical sparse grids in the 2D case based on the trapezoidal rule, the Clenshaw-Curtis formula, the Gauss-Patterson formula, and the Gauss-Legendre formula.

One substantial difference to Monte Carlo and Quasi-Monte Carlo methods is the use of weight factors of different size. Now, in the representation $Q_N f = \sum_{i=1}^{N} w_i f(x_i)$, the weights $w_i$ of the sparse grid method are not all equal to 1/N.

The order of convergence of the classical sparse grid method is $\epsilon = O(\log(N)^{(d-1)(r+1)} N^{-r})$ and thus it is also independent of the dimension d. In contrast to Monte Carlo and Quasi-Monte Carlo methods, the sparse grid method is able to use the smoothness r of the integrand and thus has exponential convergence for smooth integrands (r?∞). Thus, for smooth integrands this method is substantially faster than the Monte Carlo or Quasi-Monte Carlo methods.

For the sparse grid method, one problem is that the convergence rate deteriorates for non-smooth integrands which show up for options, and its advantage is thus lost. Another problem is that the method is, just as the Quasi-Monte Carlo method, not entirely independent of the dimension, and the rate of convergence also degrades with rising dimension.

SUMMARY OF THE INVENTION

It is one object of this invention to provide a method and a device for fast and accurate valuation of complex financial derivatives, such as for use by banks, insurance companies and/or private investors.

It is another object of this invention to provide a method and device for determining a price of the complex financial derivatives, as a function of an expectation.

It is yet another object of this invention to provide a method and device that increases accuracy and decreases running time as required by conventional devices and methods for computing the expectations, such as based on Monte Carlo or Quasi-Monte Carlo integration.

The above and other objects of this invention are accomplished, according to one embodiment of this invention, with a method and device, such as a computer, that performs valuation of financial derivatives based on multivariate numerical integration using sparse grids. The method of this invention can compute arising expectations more efficiently than conventional methods and thus can compute and determine prices of the derivatives much faster and with much more accuracy than conventional methods and devices.

In one embodiment of this invention, the device includes an input unit, an output unit, a memory unit and a program unit. The program unit has a setup module, a discretization module and an integration module. In the event of non-smooth integrands, for example those associated with option pricing, transformations decompose the integration domain into smooth subdomains. Dimension reduction and parallelization are also used to accelerate the method of this invention.

The method and device of this invention provides fast and accurate determination of objective prices and subjective prices of financial derevatives, such as bonds, swaps, futures, CMOs, and options. The calculated prices can be used in purchasing or selling the derivatives, such as for portfolio optimization, pricing of contracts, risk management and/or investment decision making.

BRIEF DESCRIPTION OF THE DRAWINGS

Features of the method and device according to this invention can be better understood when the specification is read in view of the drawings, wherein.

DESCRIPTION OF PREFERRED EMBODIMENTS

This invention relates to a device comprising a computer and a method which is based on the sparse grid method. This invention allows the fast computation of expectations which are required for the valuation of derivatives from finance and banking, for example, interest rate, asset, currency, and/or commodity derivatives.

Figure 1:
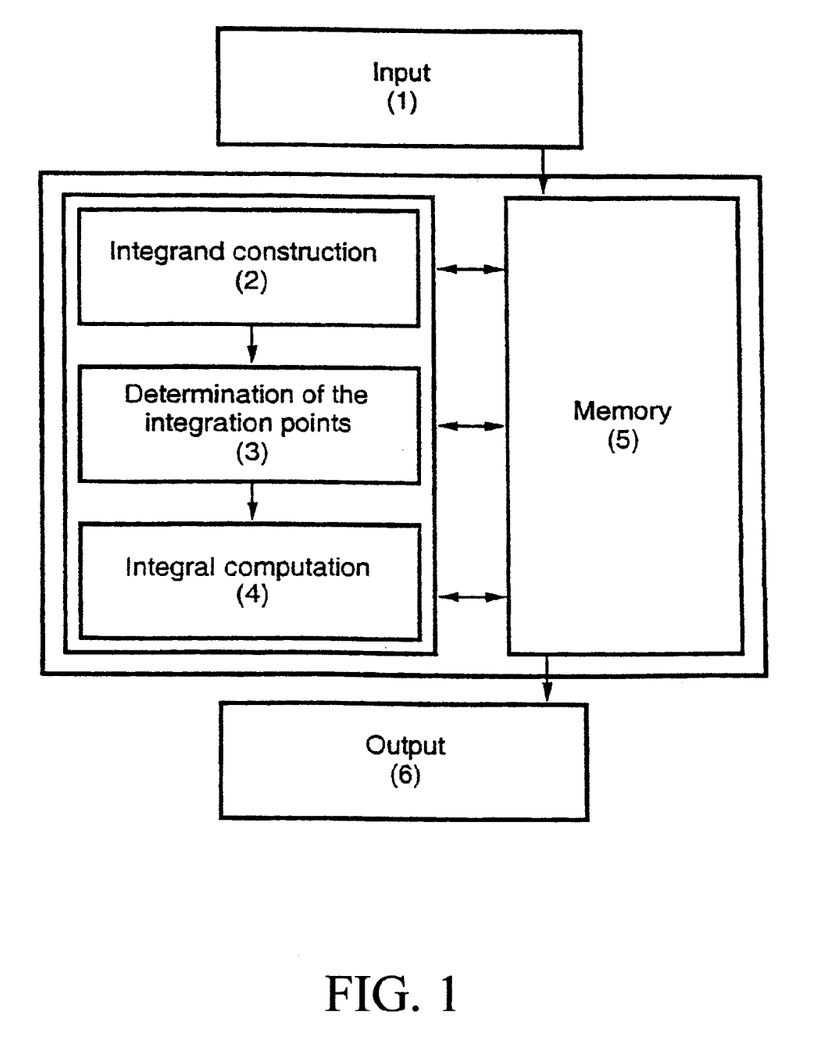
FIG. 1 is a block diagram showing different components of a device according to one embodiment of this invention.

FIG. 1 shows a block diagram of the method and device which comprises a computer having an input unit (1) and an output unit (6), a memory unit (5) and a program unit (2-4). The input and output units (1, 2) facilitate the input of the parameters of the derivative and the output of the value of the derivative. The memory unit is used for storing the program, the input and output values, and intermediate results. The program unit (2-4) comprises a setup module (2), a discretization module (3), and an integration module (4). The setup module (2) is used to determine the integrand function. The discretization module (3) determines suited integration points using sparse grids. The integration module (4) computes the value of the derivative through combination of the function values at the integration points.

The following specification more precisely describes the individual components. The input (1) can be fed by any suitable input, such as a keyboard, another input device, or an analog or digital connection. The input data specifies the exact type of derivative as well as the properties of underlying values. This data as well as other intermediate results are stored in memory. A computer program reads this data in a first step, refered to as setup and constructs a multivariate integration problem based on the input data. In a second step, referred to as discretization, suited integration points and integration weights are determined based on the sparse grid method using this information. In the third step, refered to as integration, the integration problem is solved through evaluation of an integrand at computed integration points and by combination of the results. The value of the derivative is returned as the final result. The output (6) can be read through a monitor, another output device, or an analog or digital connection.

The method of this invention can be used to smooth integrands which typically arise in the valuation of interest rate derivatives without further modification. Examples are portfolio optimization, the pricing of futures and forward contracts, the valuation of mortgage-based securities, the pricing of insurance contracts, risk management, or investment decision making. In the case of non-smooth integrands, for example which arise in option pricing, the convergence rate of the method is deteriorated. In practically all cases the integrands have discontinuous derivatives ($r=1$), in some cases the integrand itself is discontinuous ($r=0$). According to this invention, there is a decomposition of the integration domain into smooth parts in the discretization step, for example by zero finding. Using suited transformations the sparse grid quadrature formulas are mapped to these subdomains and the total integral is computed as the sum of these partial integrals. Thus, integration takes place only over smooth areas and the advantageous properties of the sparse grid method are maintained.

The sparse grid method is largely, but not totally, independent of the dimension of the integration problem. The dimension d occurs in the order of convergence as the exponent of a logarithmic factor. This leads to a relatively slow degradation of the convergence as the dimension d is rising. Therefore, it is reasonable to use dimension-reducing methods. In the case of path-dependent options the underlying stochastic process can be discretized hierarchically, for example using the Brownian bridge construction. In the case of performance-dependent options, the volatility matrix is transformed using singular value decomposition. In both cases, a reduction of the effective dimension is achieved by focusing on the respective most important dimensions. In the discretization module, the sparse grid method uses more accurate quadrature formulas in more important dimensions and less accurate formulas in less important dimensions. This way, in many cases a practical independence of the dimension is achieved for the method. In other cases at least a strong acceleration of the method can be obtained.

Figure 2:
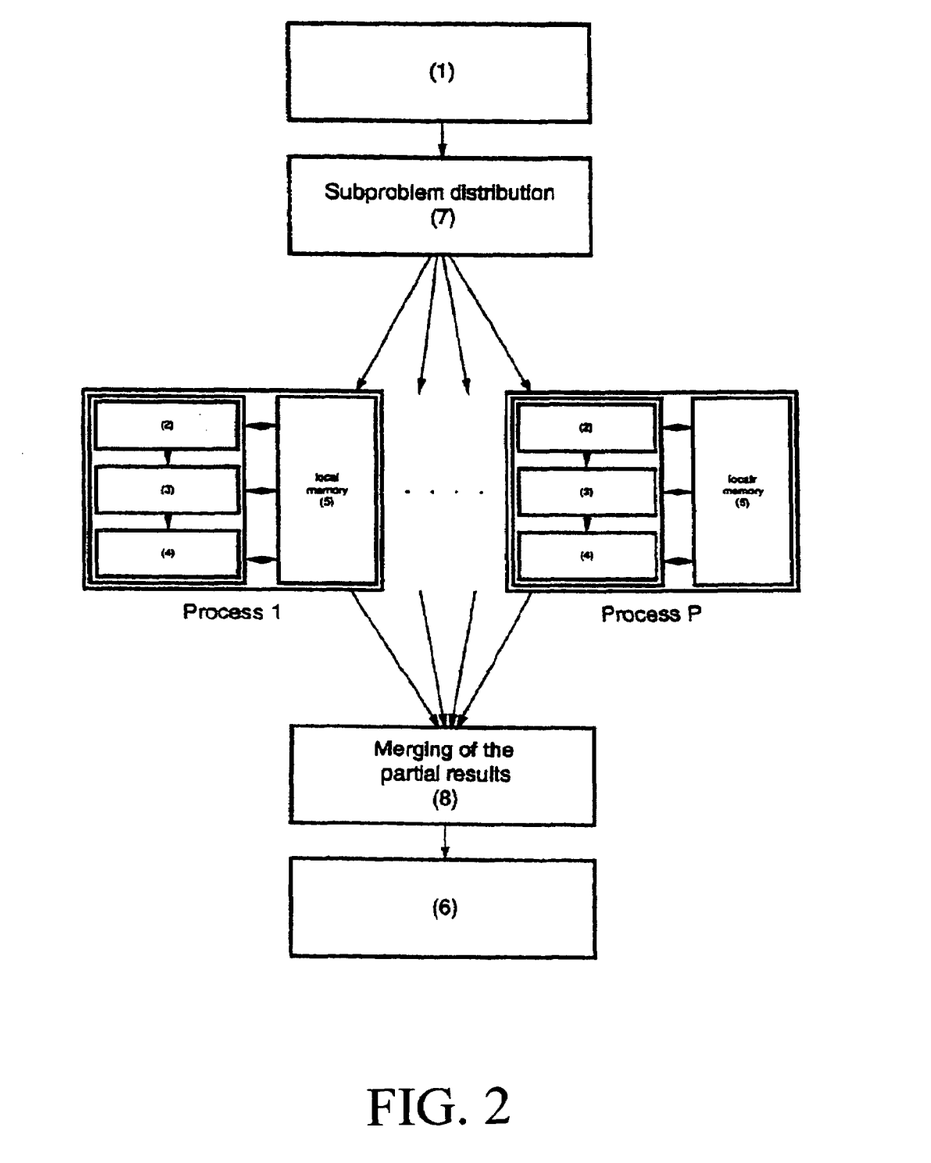
FIG. 2 is a block diagram showing a subdomain, processed in a parallel computer system with distributed memory, according to one embodiment of this invention.
Figure 3:
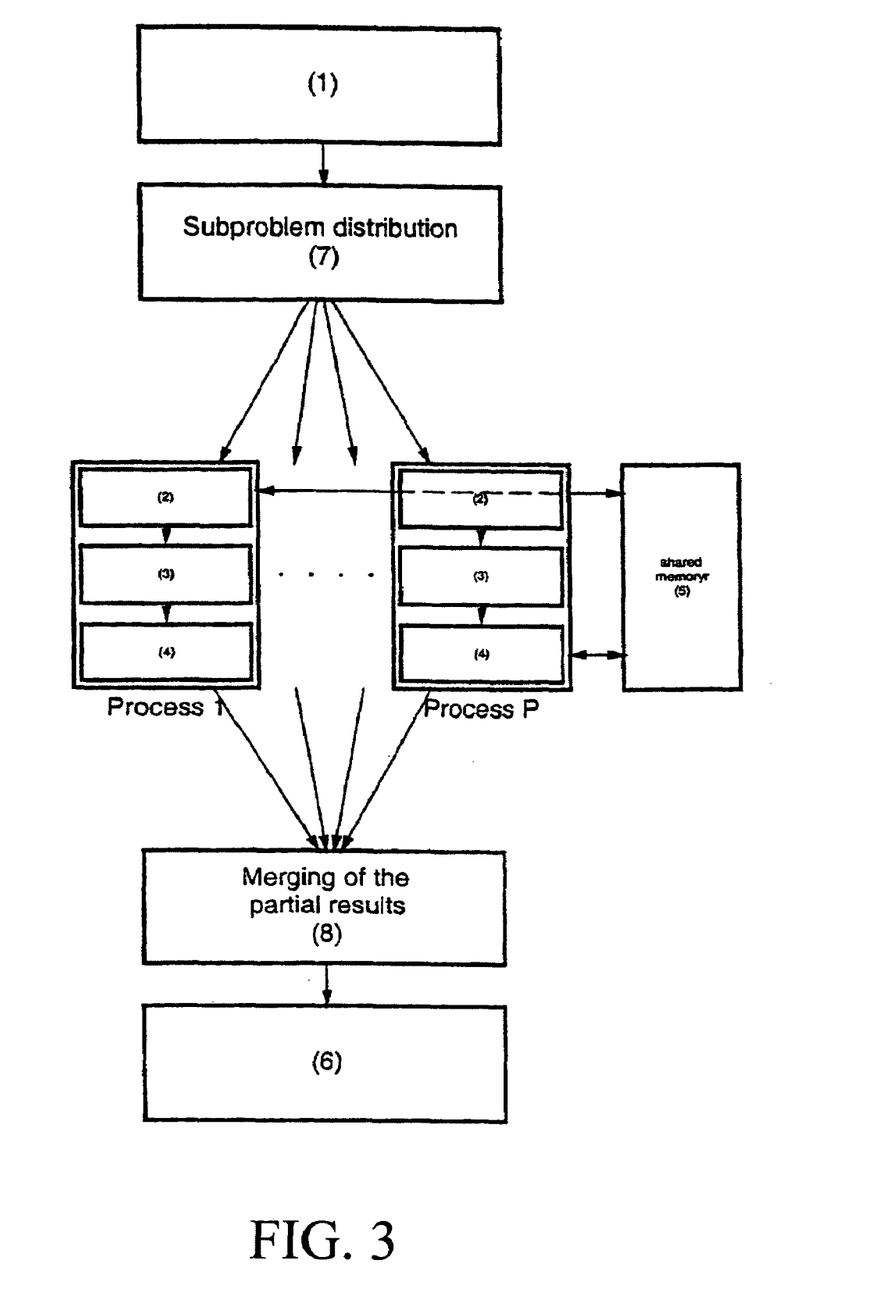
FIG. 3 is a block diagram of a subdomain processed in a parallel computer system with shared memory, according to another embodiment of this invention.

An additional acceleration of the method of this invention occurs through parallelization, such as a distributed computation on several processors. At this step, the entire integration problem is decomposed into independent subproblems. These are, for example, the subdomains originating from above transformation or the partial sums over the different multiindices k in the sparse grid quadrature formula. The device is shown in FIGS. 2 and 3. The distribution module (7) performs the decomposition of the integration problem. The combination module (8) combines the partial results during the parallel computation. The individual partial problems are processed either in a parallel computer system with distributed memory, such as shown in FIG. 2 or with shared memory, such as shown in FIG. 3.

EXAMPLE

An option is a contract between two parties which gives the holder the right but not the obligation to buy/sell a fixed amount of assets at a certain date for a fixed price. Thus, an option has an intrinsic value, since the holder does not have to exercise the option. One question to answer is how to obtain a fair price for the option. More precisely, using the martingale approach there is a value:

$$V = e^{-rT} E(P(\{S_i^j\}))  \quad \text{Equation 7}$$

Here, r is the constant interest rate, t=T is the exercise time, P is the payoff function, and $S_i^j$ is the asset price of the i-th asset of the portfolio at time $j\Delta t$ with $\Delta t = T/M$. Here, M is the number of discrete time stype j=1, ..., and M and N each denotes the number of considered assets i=1, ..., $N \cdot e^{-rT}$ is the discount factor and t=0 is the time of valuation.

Assuming that the assets of the portfolio follow a model described by the stochastic differential equation $$dS_i = \mu_i S_i dt + \sum_{k=1}^{N} \sigma_{ik} S_k dW_k \quad \text{Equation 8}$$

where $(\sigma_{ik})$ denotes the time-constant volatility matrix, $\mu_i$ the time-constant drift for asset i and $dW_i$ a geometric Brownian process for asset i, such as $W_i$ is the Wiener measure. There are also approaches with time-varying volatility matrices and time-varying drift. In this case $\sigma_{ik}$ and $\mu_i$ follow own SDEs modeling their behavior. Integration and Itô-formula yield after time discretization using the time steps $j\Delta t$ the values $S_i^j$.

$$S_i^{j+1} = S_i^j \cdot e^{(\mu_i - 1/2(\Sigma_{k=1}^N \sigma_{ik}^2))\Delta t + \Sigma_{k=1}^N \sigma_{ik} \sqrt{\Delta t} W_k^j} \quad \text{Equation 9}$$

and thus $$S_i^j = S_i^0 e^{\Sigma_{l=1}^j [(\mu_i - 1/2(\Sigma_{k=1}^N \sigma_{ik}^2))\Delta t + \Sigma_{k=1}^N \sigma_{ik} \sqrt{\Delta t} W_k^l]} \quad \text{Equation 10}$$

Here $W_k^l$ are N(0,1)-distributed random variables. In a computer program the first recursive formula is used. However, following non-recursive summated form is necessary to define the later integrand.

The definition of the expectation $E(\cdot)$ is now for a general function $f$ defined by:

$$E(f(\{\chi_i^j\})) = \int_{-\infty}^{\infty} \ldots \int_{-\infty}^{\infty} f(\{\chi_i^j\}) g(\chi_1^1) \ldots g(\chi_N^M) d\chi_1^1 \ldots d\chi_N^M \quad \text{Equation 11}$$

with the standard normal distribution $$g(\chi) = \frac{1}{\sqrt{2\pi}} e^{-\chi^2/2} \quad \text{Equation 12}$$

With the requirement that arbitrage does not exist, an expectation is taken with respect to the equivalent martingale measure of the underlying process. Here, $\mu_i$ is replaced by r in the integral of the expectation. This way, also the change from the stochastic differential equation into its risk-neutral form takes place.

Now, only the concrete payoff functions are missing and these depend on the respective option type. In general, the functions have the structure $$P(\{S_i^j\}) = \max(0, H(\{S_i^j\}) - K) \quad \text{Equation 13}$$

for call options and $$P(\{S_i^j\}) = \max(0, K - H(\{S_i^j\})) \quad \text{Equation 14}$$

for put options. Thereby, K is the strike price. Examples are path-dependent options where N=1, M>1 and performance-dependent options where N>1, M=1.

The most popular example for path-dependent options are so-called Asian options. Here, the average over the asset prices at all points in time between the current time and the exercise time are taken for the payoff function. Consider the case of the geometric average such as $H(\{S_i^j\}) = (S_1^1 \cdot S_1^2 \cdot \ldots \cdot S_1^M)^{1/M}$. In this case, a closed-form solution in form of a generalized Black-Scholes formula is available. Small changes and variations, for example already the arithmetic average, are not solvable analytically and require a special numerical integration method.

An example for performance-dependent options are conventional so-called "Tailored options". Here, the price of the option depends on the relative performance of one asset in comparison to the other assets in a considered set of assets. One example for a call option is $$P(\{S_i^j\}) = \begin{cases} \max(S_1^1 - K, 0) & \text{if } S_1^1/S_1^0 > S_i^1/S_1^0, 1 < i \leq N \\ a \cdot \max(S_1^1 - K, 0) & \text{else} \end{cases} \quad \text{Equation 15}$$

where a is a parameter in [0, 1]. A mixture of both option types is, of course, also possible. M=N=1 yields as a special case the European call option with the Black-Scholes formula as analytic solution.

Now, for option pricing it is generally necessary to solve a high-dimensional integration problem. The dimension results from the time steps over which the average is taken for path-dependent options and/or from the number of considered assets for performance-dependent options. The integration domain is so far $(-\infty,\infty)^{N \cdot M}$ due to the definition of the expectation. In order to be able to apply integration methods, the integral of the expectation is transformed using the cumulative normal distribution $G(y) := \int_{-\infty}^{y} g(x) dx$ onto $[0, 1]^{N \cdot M}$ to get $$E(f(\{\chi_i^j\})) = \int_0^1 \ldots \int_0^1 f(\{G(\chi_i^j)\}) d\chi_1^{\ 1} \ldots d\chi_M^{\ N} \quad \text{Equation 16}$$

For the integration of Equation 16 with Equation 13 or Equation 15 the sparse grid method is applied profitably.

Figure 5:
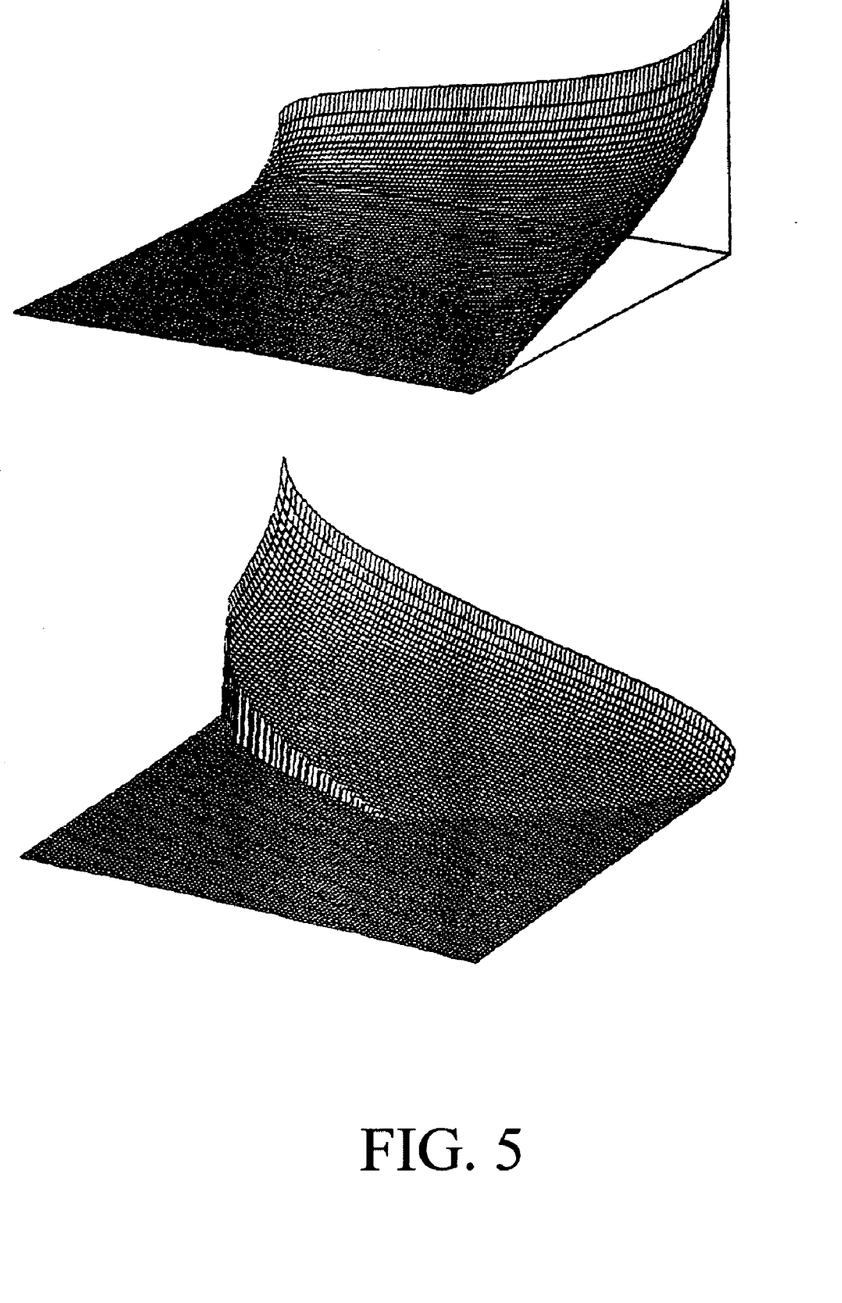
FIG. 5 shows diagrammatic views of three-dimensional renderings which compare different integration methods for valuation of path-dependent options.
Figure 6:
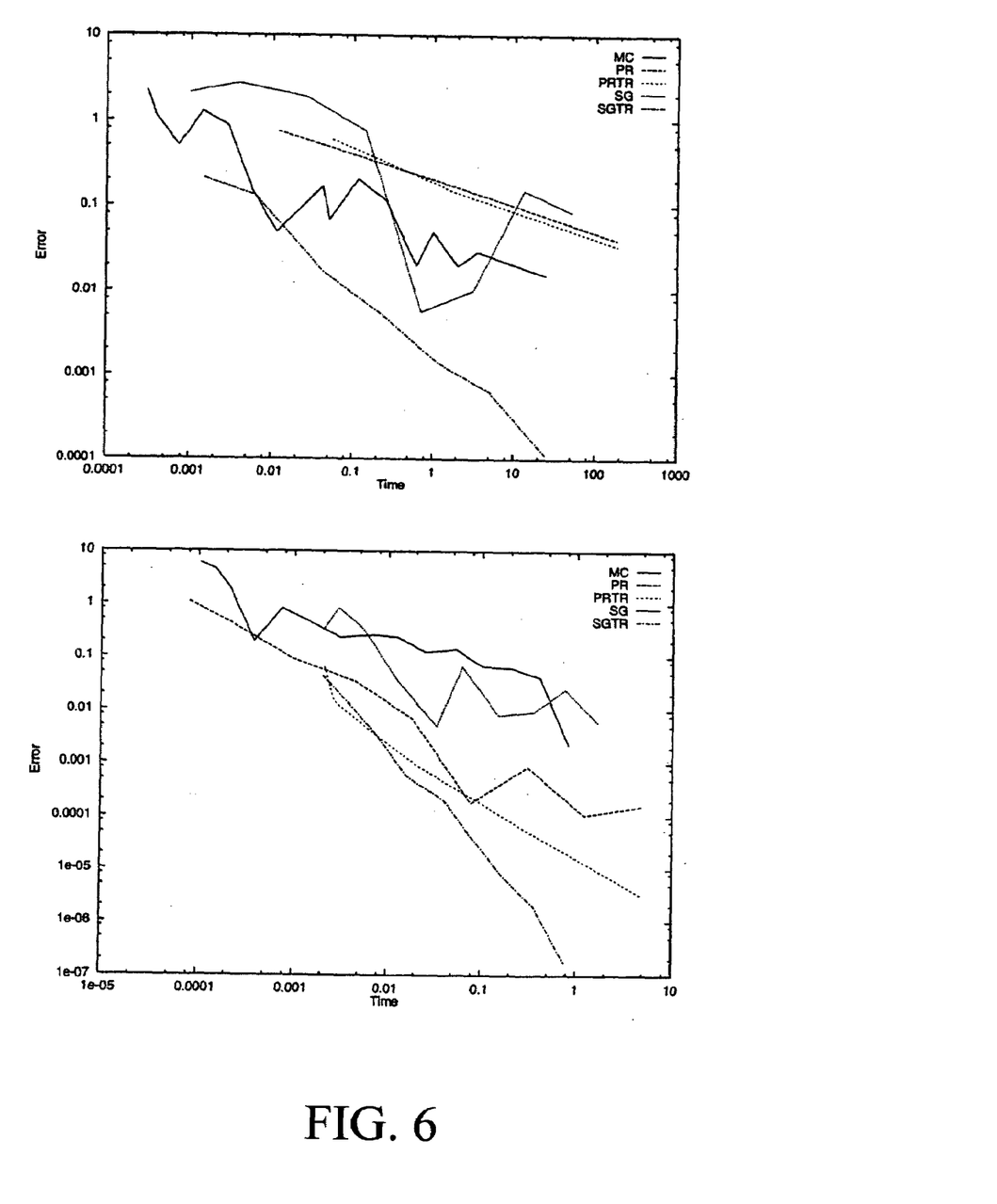
FIG. 6 shows graphic representations of an error parameter versus a time parameter for different methods.

For options one problem is that the payoff function is no longer smooth due to the nature of an option. This ultimately expresses that the option will not be exercised if the purchase or sale of the underlying asset would result in a loss. The integrand shows a kink, path-dependent options, or even jumps, performance-dependent options, with respect to a (M·N−1)-dimensional manifold. Besides the singularities on the boundary of the integration domain which result from the transformation to $[0,1]^d$. Examples for integrands in the two-dimensional case are shown in FIG. 5. The kink, respectively jump is clearly visible. The smoothness requirements for the application of the sparse grid method are no longer fulfilled.

Now integrating only over the support of the integrand, the integrand is a smooth function, and the kinks and jumps are exactly located on the boundary of the support. To determine the integration area it is sufficient to compute the zeros of the integrand. When the integral is computed iteratively, the zero finding is restricted to one, the last, dimension. The zero $\hat{\chi}$ in the last dimension, Newton method for the kink or bisection for the jump, is determined and the integrand with respect to the last dimension is transformed with the linear mapping $$t(\chi) = \chi \cdot (1 - \hat{\chi}) + \hat{\chi} \quad \text{Equation 17}$$

onto $[0, 1]$.

FIG. 5 shows a comparison of the different integration methods for the valuation of a path-dependent option with 6 times steps, M=6, N=1, and a performance-dependent option with M=1, N=2. The superior rate convergence of sparse grid method using transformation and Gauss-Patterson formulas with respect to other methods, Monte Carlo (MC), classical product approach without (PR) and with transformation onto the support (PRTR), Quasi-Monte Carlo without (QM) and with transformation onto the support (QMTR), as well as Gauss-Patterson sparse grids without (SG) and with transformation onto the support (SGTR), is clearly visible. The error is plotted logarithmically and shows that the method of this invention is superior to the Monte Carlo and Quasi-Monte Carlo methods which cannot use the higher smoothness of the integrand while the general sparse grid quadrature of this invention can use it in an optimal way.

Since the complexity of the sparse grid method of this invention is not totally independent of the dimension of the problem due to the term $\log (N)^{(d-1)(r+1)}$, it makes sense to also apply dimension reduction methods. The method can be accelerated using a hierarchical discretization of the stochastic process and adaptive refinement.

The most natural way to discretize a stochastic process is through a random walk, such as by the recursive formula $$S_i^{j+1} = S_i^j e^{b(W_i^j)} \quad \text{Equation 18}$$

where $b(W_i^j)$ exactly corresponds to the exponent in Equation 19. In the Brownian bridge discretization, the process is discretized using a future and past value $$S_i^j = \frac{S_i^{j+k} + S_i^{j-k}}{2} e^{b(\sqrt{k\Delta t/2}\ W_i^j)} \quad \text{Equation 19}$$

This way, starting with $S_i^0$, $S_i^M := 2^{b(\sqrt{T} - W_i^M)}$ the values $S_i^{M/2}$, $S_i^{M/4}$, $S_i^{3M/4}$, $S_i^{M/8}$, $S_i^{3M/8}$, ... etc. are determined. This leads to a concentration of the total variance of the process in the first steps of the discretization which improves the convergence rate of Quasi-Monte Carlo methods.

For the classical sparse grid method there is no immediate advantage from this discretization technique since all dimensions are of same importance. The general sparse grid method can be applied dimension-adaptively, and quadrature formulas with lower degree can be used in less important dimensions. Thus, the effective dimension of the integrals such as Equation 16 is reduced for path-dependent derivatives and the resulting integration problems can be computed faster and more accurately.

We claim:

1. A method for valuation of financial options by a data processor, wherein a value of an option is computed by a determination of an expectation by the data processor, the method comprising:
   receiving in the data processor a plurality of input parameters specifying the option;
   constructing with the data processor a multivariate integrand representing option payoffs as a mathematical function of the input parameters;
   determining with the data processor a multivariate integration domain representing the region where the option payoffs are nonzero by computing discontinuities of the multivariate integrand;
   constructing by a sparse grid quadrature method with the data processor a plurality of integration points inside the multivariate integration domain and a plurality of integration weights;
   determining with the data processor a plurality of integrand values each representing an option payoff by evaluating the multivariate integrand at each of the integration points;
   determining with the data processor an expected value of all option payoffs by the summation of the integrand values multiplied by the corresponding integration weights;
   determining with the data processor the value of the option by discounting the expected value; and
   outputting the value of the option to a display in combination with the data processor.

2. The method according to claim 1 wherein the multivariate integration domain is determined by finding an integration area by computing zeros of the integrand.

3. The method according to claim 1 wherein the integration points and the integration weights are determined dynamically or adaptively when evaluating the integrand.

4. The method according to claim 1 wherein the data processor computes the multivariate integration domain as a plurality of partial integrals.

5. The method according to claim 1 wherein the data processor computes in parallel at least one of the integration points, the integration weights, the evaluation of the integrand and the combination of the integrand values.

6. The method according to claim 1 wherein a dimension of integrals is reduced to accelerate the method.

7. The method according to claim 1 wherein at least one second expectation is computed, and the expectation and the at least one second expectation are combined.

8. The method according to claim 1 wherein one of a keyboard input and an input device is used to input the input parameters.

9. The method according to claim 1 wherein the integrand is evaluated by integrating the integrand.

10. The method according to claim 1 wherein the value of the option is communicated as at least one of a digital signal and an analog signal and the value is displayed on at least one of a monitor and an output device.

11. A device for valuation of financial derivatives with options, wherein a value of a derivative with an option is computed by a determination of an expectation, the device comprising:
an input unit communicating a plurality of input parameters specifying the payoffs of the option to a computer;
the computer comprising:
a setup module for establishing a multivariate integrand representing the option payoffs as a mathematical function of the input parameters and computing a multivariate integration domain representing a region where the option payoffs are zero,
a discretization module for computing by a sparse grid quadrature method a plurality of integration points inside the multivariate integration domain and a plurality of corresponding integration weights, and
an integration module for evaluating the multivariate integrand inside the integration domain at the integration points and computing a plurality of integrand values each representing an option payoff, computing an expected value of all option payoffs by a summation of these integrand values multiplied by the corresponding integration weights, and computing the value of the option by discounting the expectation; and
an output unit for communicating the value of the option.

12. In the device according to claim 11 wherein the input unit communicates the input parameters and the output unit communicates the value as at least one of a digital signal and an analog signal.

13. In the device according to claim 11 wherein the computer comprises at least one processor computing the integration domain as a plurality of partial integrals.

14. In the device according to claim 11 wherein the computer comprises a plurality of processors computing in parallel at least one of the integration points, the integration weights, the evaluation of the integrand and the combination of the integrand values.

15. In the device according to claim 11 wherein the input unit comprises one of a keyboard input and an input device for inputting the input parameters.

16. In the device according to claim 11 wherein the computer communicates the value of the derivative as at least one of a digital signal and an analog signal.

17. In the device according to claim 11 wherein the output unit comprises at least one of a monitor and an output device.

18. In the device according to claim 11 wherein the integration module determines the integration domain by computing discontinuities of the integrand.

19. In the device according to claim 11 wherein the integration module determines the integration domain by finding an integration area by computing zeros of the integrand.

20. A method for valuation of financial options by a data processor, wherein a value of an option is computed by a determination of an expectation by the data processor, the method comprising:
receiving in the data processor a plurality of input parameters specifying underlying values of the option;
constructing with the data processor a multivariate integrand representing option payoffs as a mathematical function of the input parameters;
determining with the data processor a multivariate integration domain representing the region where the option payoffs are nonzero by computing discontinuities of the multivariate integrand;
constructing with the data processor using a sparse grid a plurality of integration points inside the multivariate integration domain and a plurality of integration weights;
determining with the data processor a plurality of integrand values each representing an option payoff by evaluating the multivariate integrand at each of the integration points;
determining with the data processor an expected value of all option payoffs by the summation of the integrand values multiplied by the corresponding integration weights;
determining with the data processor the value of the option by discounting the expected value; and
outputting the value of the option to a display in combination with the data processor.

* * * * *